US012566236B1

(12) United States Patent
Bosse et al.

(10) Patent No.: US 12,566,236 B1
(45) Date of Patent: Mar. 3, 2026

(54) AUTOMATED SENSOR NOISE MODEL TUNING

(71) Applicant: Zoox, Inc., Foster City, CA (US)

(72) Inventors: Michael Carsten Bosse, Templeton, CA (US); Jeffrey Eric Tolliver, San Mateo, CA (US)

(73) Assignee: Zoox, Inc., Foster City, CA (US)

( * ) Notice: Subject to any disclaimer, the term of this patent is extended or adjusted under 35 U.S.C. 154(b) by 594 days.

(21) Appl. No.: 17/982,316

(22) Filed: Nov. 7, 2022

(51) Int. Cl.
| | |
|---|---|
| *G06F 11/30* | (2006.01) |
| *G01S 5/02* | (2010.01) |
| *G01S 5/20* | (2006.01) |

(52) U.S. Cl.
CPC .............. *G01S 5/0294* (2013.01); *G01S 5/20* (2013.01)

(58) Field of Classification Search
CPC ................................. G01S 5/0294; G01S 5/20
See application file for complete search history.

(56) References Cited

U.S. PATENT DOCUMENTS

| | | | |
|---|---|---|---|
| 2017/0248688 A1* | 8/2017 | Campbell | ............. G01S 7/4026 |
| 2021/0063560 A1* | 3/2021 | Bosse | ..................... G01S 13/60 |

FOREIGN PATENT DOCUMENTS

| | | | |
|---|---|---|---|
| WO | WO-2019042523 A1 * | 3/2019 | ............. G01S 13/60 |

* cited by examiner

*Primary Examiner* — Phuong Huynh
(74) *Attorney, Agent, or Firm* — Lee & Hayes, P.C.

(57) ABSTRACT

Auto-tuning covariances associated with a set of noise models for a variety of sensor modalities and/or perception components such that the covariances are leveled respective to one another may include whitening the covariances and/or error models and determining scalars to apply to the covariances. Determining these scalars may comprise using the residuals that result from generating the set of noise model (e.g., such as may be determined as part of least squares estimation) along with the hat matrix of the process model to determine the scalars. The covariances may iteratively be updated until the scalar adjustments converge or until another end condition is met.

20 Claims, 4 Drawing Sheets

200 ⌐

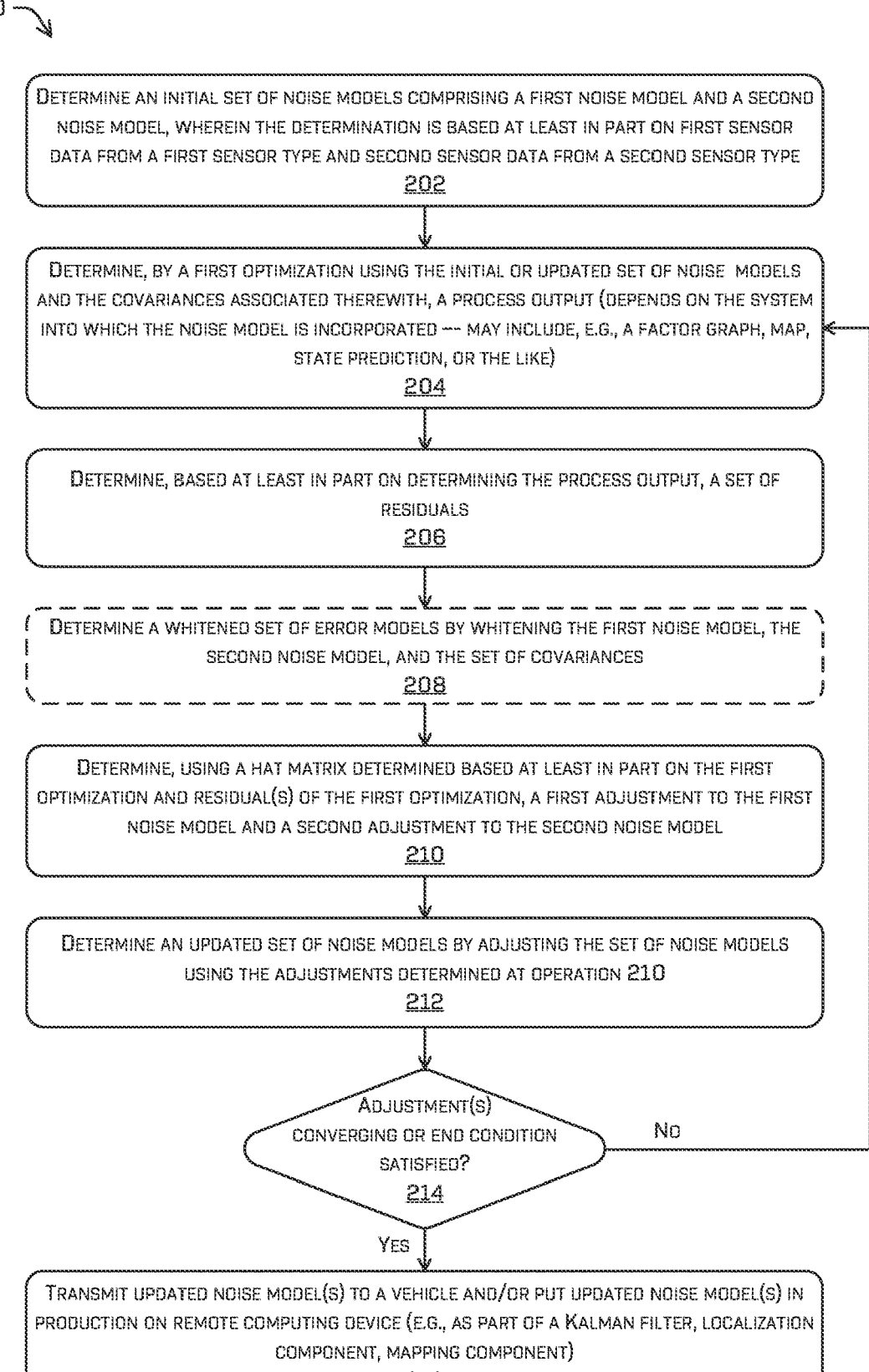

DETERMINE AN INITIAL SET OF NOISE MODELS COMPRISING A FIRST NOISE MODEL AND A SECOND NOISE MODEL, WHEREIN THE DETERMINATION IS BASED AT LEAST IN PART ON FIRST SENSOR DATA FROM A FIRST SENSOR TYPE AND SECOND SENSOR DATA FROM A SECOND SENSOR TYPE
202

DETERMINE, BY A FIRST OPTIMIZATION USING THE INITIAL OR UPDATED SET OF NOISE MODELS AND THE COVARIANCES ASSOCIATED THEREWITH, A PROCESS OUTPUT (DEPENDS ON THE SYSTEM INTO WHICH THE NOISE MODEL IS INCORPORATED — MAY INCLUDE, E.G., A FACTOR GRAPH, MAP, STATE PREDICTION, OR THE LIKE)
204

DETERMINE, BASED AT LEAST IN PART ON DETERMINING THE PROCESS OUTPUT, A SET OF RESIDUALS
206

DETERMINE A WHITENED SET OF ERROR MODELS BY WHITENING THE FIRST NOISE MODEL, THE SECOND NOISE MODEL, AND THE SET OF COVARIANCES
208

DETERMINE, USING A HAT MATRIX DETERMINED BASED AT LEAST IN PART ON THE FIRST OPTIMIZATION AND RESIDUAL(S) OF THE FIRST OPTIMIZATION, A FIRST ADJUSTMENT TO THE FIRST NOISE MODEL AND A SECOND ADJUSTMENT TO THE SECOND NOISE MODEL
210

DETERMINE AN UPDATED SET OF NOISE MODELS BY ADJUSTING THE SET OF NOISE MODELS USING THE ADJUSTMENTS DETERMINED AT OPERATION 210
212

ADJUSTMENT(S) CONVERGING OR END CONDITION SATISFIED?
214

NO

YES

TRANSMIT UPDATED NOISE MODEL(S) TO A VEHICLE AND/OR PUT UPDATED NOISE MODEL(S) IN PRODUCTION ON REMOTE COMPUTING DEVICE (E.G., AS PART OF A KALMAN FILTER, LOCALIZATION COMPONENT, MAPPING COMPONENT)
216

SENSOR(S) 302

SENSOR MEASUREMENTS
304

OPTIMIZATION 306

PROCESS MODEL 308

FACTOR(S)
310

NOISE MODELS 312

SET OF COVARIANCE(S)
314

ESTIMATED ERRORS
316

POSE GRAPH
318

NOISE MODEL TUNING
322

RESIDUALS
320

PARAMETER(S)
324

AUTOMATED SENSOR NOISE MODEL TUNING

BACKGROUND

Various systems, such as autonomous vehicles, may use sensors to capture data regarding an environment, e.g., the environment through which the autonomous vehicles traverse. Autonomous vehicles use this sensor data to detect objects in the environment to avoid collisions. However, sensors are not perfectly accurate and/or precise all the time and may even output large measurement errors, at times, which can put systems that rely on the sensors at risk. Moreover, methods of dealing with such errors may reduce or eliminate the human interpretability of how such methods function, complicating or rendering impossible the investigation, remediation, and tuning of such systems.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

FIG. 2 illustrates a flow diagram of an example process for adjusting the covariance output by a noise model, while taking into account interactions between different sensor modalities and the effect changes to the noise models make on the residuals used by the system.

FIG. 3 illustrates a block diagram of an example system that incorporates a noise model for estimating and/or predicting a state, as may be used in a measurement model, prediction model, or the like.

FIG. 4 illustrates a block diagram of an example system comprising a noise model tuned according to the techniques discussed herein and that may be used in a variety of applications, such as in generating a pose graph, a factor graph, map data, object detection and/or tracking, and the like.

DETAILED DESCRIPTION

Figure 1:
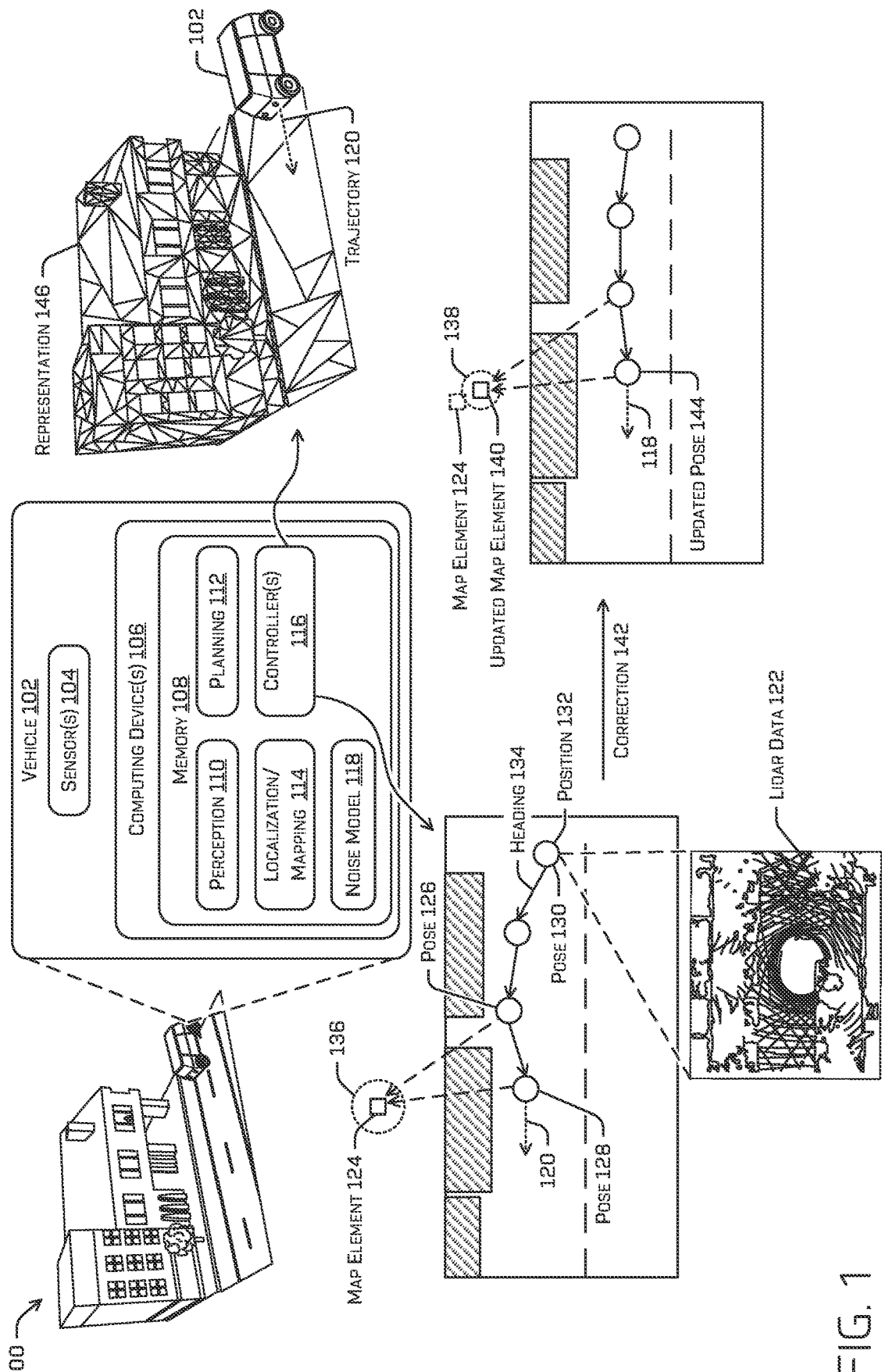
FIG. 1 illustrates an example scenario in which an autonomous vehicle may receive sensor data associated with an environment that may be used to generate a pose graph estimating a vehicle position, orientation, and/or trajectory, as a non-limiting example of an application for which a noise model may be used. Tuning the noise model may result in alterations and improvements to such a pose graph.

As discussed above, systems may rely on sensor data for various purposes, e.g., to detect objects in an environment, map the environment, and/or plan a trajectory through an environment. Errors in such sensor data present a preeminent risk, but are largely unavoidable at some point, as sensor data may be associated with errors that may be unavoidable (e.g., the physics of the sensor itself renders some amount of imprecision). The techniques discussed herein include determining a noise model that predicts this error for each sensor of an autonomous vehicle so that the autonomous vehicle can tolerate some amount of error when planning actions by the autonomous vehicle. Various autonomous vehicle systems may make use of such a noise model. For example, a simultaneous localization and mapping (SLAM) algorithm may use such a noise model to estimate a position and orientation of the vehicle, generate a map of the environment from sensor data, detect where an object is in the environment, and/or predict where a moving object will be.

The techniques discussed herein further address an imbalance between noise models associated with different sensor types. For example, a noise model associated with an inertial measurement unit (IU) may give its error in units of milliradians, whereas the noise model associated with a lidar sensor (or group of lidar sensors) may give its error in units of meters. In generating an estimate of the IMU's noise model and the lidar's noise model, such as by using least squares regression, the process of determining the noise models may generate a set of residuals for each noise model and a set of covariance(s) may be determined for each noise model. The residuals may indicate how well the noise model fits sensor data upon which the noise model is based (i.e., a difference between the predicted value of the error and the observed measurement) and the covariance(s) may indicate the extent to which the noise model accurately models the sensor data error or, more simply, how much the noise model can be trusted. Since the different types of sensors have different units and operate completely differently, the different residuals of the different sensor systems may be wildly different.

For example, an average residual associated with the IU may be 20 milliradians, whereas the average residual associated with the lidar sensor may be 0.05 meters. Determining different covariances for these wildly different residuals may result in covariances that, in comparison to each other, inadequately portray how much the respective noise models should be trusted. Returning to the IU noise model and lidar noise model example, it may be that the covariances associated with the IU have a greater magnitude than the covariance associated with the lidar, thereby indicating that the IU noise model should be trusted far more than the lidar noise model. This may not, however, accurately represent the comparative trustworthiness of the noise models and a system that relies on the joint use of such noise models, such as SLAM algorithm, Kalman filter, or the like, may improperly downweight the lidar data when, in comparison, the lidar data is in fact more trustworthy by comparison to the IU data. This problem is further complicated by the fact that autonomous vehicles include numerous sensor modalities and that noise models may be generated for software components that rely on sensor data as well, such as covariances determined in association with the longitudinal and/or lateral components of a factor graph, visual detections, and/or the like.

The techniques discussed herein rectify these problems by generating estimated noise models for different sensors then jointly tuning the covariances associated with those noise models such that the covariances are leveled respective to one another. The techniques may include generating an estimated set of noise models (and their respective covariances), which may include determining a set of residuals, then iteratively tuning the covariances (and the noise models) and re-determining the set of residuals using the newly updated covariances and noise models until the adjustments to the covariances converge or some other end condition is met (e.g., the adjustments are less than a threshold adjustment, a number of iterations has been reached, an amount of time has passed, a cloud computing compute allocation has been reached).

In some examples, the techniques discussed herein include determining a noise model for an individual sensor, multiple sensors of a same sensor type/modality, and/or for a software output that is based on sensor data (e.g., camera-based object detection, such as a region of interest (ROI), sensor data segmentation, instance segmentation, object classification, and/or the like; a lidar based detection; a top-down object segmentation). Such an error may be complex when evaluated for the system as a whole. As will be described in detail herein, such a model may be linearized with a different scale associated with multiple contributing errors. For example, a first noise model may be determined in association with perception data determined from one or more camera, a second noise model may be determined in association with lidar sensor(s), a third noise model may be determined for a single IMU sensor, a fourth noise model may be determined for a global positioning system (GPS) sensor, and so on. Of course, though such models may be attributed to the various devices or measurements, the disclosure is not meant to be so limiting. Any arbitrary linearization (or other model) of a combination of errors is contemplated. Additionally or alternatively, the techniques may include determining a noise model for an environment type, which may include an environment condition (e.g., clear day, rainy, overcast, night, foggy, snowy) and/or an environ (e.g., city, suburb, highway, desert, wetland, mountain). This may be the case because sensors may perform differently in different environment conditions and/or environs. For example, lidar sensors may perform poorly in foggy conditions, but radar data and/or camera data may be reliable or at least more reliable than sensor data in fog, and city environs may present line of sight challenges for some sensors but less of a challenge for others. Moreover, different sensor models or even different sensors of a same model may exhibit different error behaviors, so the techniques discussed herein may include determining a new noise model for sensor(s) when an autonomous vehicle is to be fitted with new sensor(s).

The noise models discussed herein may be used as part of a global solver for autonomous vehicle localization (i.e., determining where the autonomous vehicle is in an environment and/or how the autonomous vehicle is oriented), tracking an object in the environment (e.g., determining attributes associated with the object over time, including historical, current, and/or predicted attributes), and/or for generating a map of the environment based at least in part on sensor data, among multiple other examples. In each of these examples, the noise model may determine an estimate of the error inherent in the output of a sensor (or group of sensors) associated with an estimate of a state of a particular attribute determined based at least in part on sensor data. Additionally or alternatively, the noise model may determine a covariance associated with the noise estimate that indicates (simplistically) how much the noise estimate should be trusted. Depending on the use case, the estimate may include an estimated wheel speed determined based at least in part on wheel encoder output data, an estimated vehicle speed based at least in part on inertial measurement unit (IMU) output data, an estimated object velocity based at least in part on camera and/or lidar data, and/or the like.

The techniques discussed herein may be applied to multiple noise models for different sensors and/or sensor types. For example, a noise model may be associated with a single sensor (e.g., a single lidar sensor) and/or a noise model may be associated with a type of sensor (e.g., all the lidar sensors). Regardless of whether there is a single type of noise model or a mix, the techniques may be applied to all the noise models and modifies the noise models in a manner that depends on the modifications being made to all the other noise models.

The techniques discussed herein further include automated noise model tuning that adjusts the covariance associated with a noise model such that the noise model covariance has a unit variance or near unit variance (i.e., the covariances output by the noise model have a standard deviation of 1 or close to 1, which may mean having a standard deviation that is less than a threshold deviation, such as 1.1, 1.2, or another number close to 1). For example, the noise model may comprise Gaussian distribution(s) and covariance associated therewith that may be whitened and then scaled by a scalar determined according to the techniques discussed herein. Whitening the noise model and covariance may include transforming the Gaussian distribution(s) and covariance, such that the covariance is an identity matrix or an approximation of the identity matrix and the noise model has updated parameters solved such that the covariance is the identity matrix.

After the noise model and the attendant covariance(s) have been generated and whitened, the residuals of the noise model generation function and the hat matrix of the noise model system into which the noise models are integrated may be used to determine the scalar discussed herein. A residual of a noise model may be determined as part of the noise model generation process and is a measure of fit of the noise model to the sensor data. For example, if least squares estimation is used to determine an estimate of the noise model, the residual(s) of the least squares estimation may be used. The residuals may be used with the hat matrix of the system into which the noise models are integrated to determine an adjustment to the covariance(s) of multiple noise models. The leverage, also known as the hat matrix or projection matrix, is a measure of the effect that particular sensor data has on generating the noise model and may be used with the residuals to determine the adjustments to the covariance(s) of multiple noise models discussed herein. In some examples, the adjustment to a noise model covariance may comprise a scalar that is applied to the noise model covariance.

This process of adjusting the covariances of the different noise models ensures that the error outputs of noise model(s) associated with different sensor types are coordinated and cohesive. For example, if a noise model associated with a first sensor modality (e.g., lidar sensor(s)) outputs predicted errors that have consistently higher residuals than residuals of predicted errors output by a noise model associated with a second sensor modality (e.g., IMU(s)) systems downstream from the noise models, such as prediction component(s) or later portions of a Kalman filter, may improperly rely on lidar data less than the prediction component should. This disparity in residuals could be caused by the different sensor types outputting data in different units (e.g., meters vs milliradians) and coordinating the residuals ensures that the covariances aren't different between sensors due merely to the difference in unit measurements. By adjusting the noise models such that their covariances have a same or similar residual distribution, the covariances generated by the noise models are more cohesive and meaningful for prediction and/or planning component(s) and the like that rely on such covariances.

In some examples, this process may be repeated after a global solver, Kalman filter, or the like re-optimizes the target data, such as by re-determining a pose graph, factor graph, or predicted state(s) or planned trajectory. The process may be repeated until a threshold number of iterations is reached, a threshold number of error distribution(s) associated with the different sensor modalities reaches a Gaussian and/or unary distribution, and/or the difference between 1 and a standard deviation of an error distribution is less than a threshold difference. Additionally or alternatively, the process may be repeated until the adjustments converge. As above, an expectation value may be determined after the optimization and compared with a square of the observed residual to determine the scale factors for the various contributions to the noise model.

The techniques discussed herein may increase accuracy of the resulting pose graph, factor graph, predicted state, map, and/or planned trajectory, depending on the use case. The techniques may also increase the safety of autonomous systems relying on noise model predictions of error associated with sensor output by giving the system a more proper sense of the accuracy of the error prediction and thereby allowing the system to adjust tolerances associated with its planned actions. Such improvements may reduce the chance of injury and/or damage to a vehicle system. Adjusting a noise model according to the techniques discussed herein may account for and reduce or eliminate overfitting by the noise model.

Example Scenario

FIG. 1 illustrates an example scenario 100 including a vehicle 102. In some instances, the vehicle 102 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 102 may be a fully or partially autonomous vehicle having any other level or classification. It is contemplated that the techniques discussed herein may apply to more than robotic control, such as for autonomous vehicles. For example, the techniques discussed herein may be applied to mining, manufacturing, augmented reality, etc. Moreover, even though the vehicle 102 is depicted as a land vehicle, vehicle 102 may be a spacecraft, watercraft, and/or the like.

According to the techniques discussed herein, the vehicle 102 may receive sensor data from sensor(s) 104 of the vehicle 102. For example, the sensor(s) 104 may include sensors of different modalities, such as a location sensor (e.g., a global positioning system (GPS) sensor), an inertia sensor (e.g., an accelerometer sensor, a gyroscope sensor, etc.), a magnetic field sensor (e.g., a compass), a position/velocity/acceleration sensor (e.g., a speedometer, a drive system sensor), odometry data (which may be determined based at least in part on inertial measurements and/or an odometer of the vehicle 102), a depth position sensor (e.g., a lidar sensor, a radar sensor, a sonar sensor, a time of flight (ToF) camera, a depth camera, an ultrasonic and/or sonar sensor, and/or other depth-sensing sensor), an image sensor (e.g., a camera), an audio sensor (e.g., a microphone), and/or environmental sensor (e.g., a barometer, a hygrometer, etc.).

The sensor(s) 104 may generate sensor data, which may be received by computing device(s) 106 associated with the vehicle 102. However, in other examples, some or all of the sensor(s) 104 and/or computing device(s) 106 may be separate from and/or disposed remotely from the vehicle 102 and data capture, processing, commands, and/or controls may be communicated to/from the vehicle 102 by one or more remote computing devices via wired and/or wireless networks.

Computing device(s) 106 may comprise a memory 108 storing a perception component 110, a planning component 112, a localization and/or mapping component 114, system controller(s) 116, and/or noise model 118. Although depicted in FIG. 1 for illustrative purposes, it is understood that the localization and/or mapping component 114 may reside in/on a separate computing device (or otherwise) than any one or more of the other components.

In general, the perception component 110 may determine what is in the environment surrounding the vehicle 102 and the planning component 112 may determine how to operate the vehicle 102 according to information received from the perception component 110. For example, the planning component 112 may determine trajectory 120 based at least in part on the perception data and/or other information such as, for example, one or more maps, such as a map data determined according to the techniques discussed herein, localization information (e.g., where the vehicle 102 is in the environment relative to a map and/or features detected by the perception component 110), and/or the like. In some examples, the perception component 110 may comprise a pipeline of hardware and/or software, which may include one or more GPU(s), ML model(s), Kalman filter(s), and/or the like.

For example, the map data may comprise map element(s) that indicate various key objects and/or regions in the environment, such as the location (and/or extents i.e., the shape/size) of important objects or regions in the environment. These map element(s) may include, for example, an annotation that indicates a portion of map data, such as a two-dimensional representation of the environment associated with a drivable surface, a pedestrian conditional surface such as a crosswalk, a permanent pedestrian or cycling surface, a parking surface, traffic signage (e.g., stop light, stop sign, yield sign, speed sign, commuter lane, a construction sign), traffic indications (e.g., a stop line, a yield line, a crosswalk indication, a commuter lane indication, a traffic cone, a flare), various drop-off or pick-up zones, etc. In other words, the map indicates the significance of a portion of map data, regardless of whether the map data is two- or three-dimensional. Additional map data may be generated that may include a three-dimensional representation of the environment such as a mesh, wire frame model, polygons, surfels (e.g., polygons associated with individual color and/or intensity), and/or the like.

In some examples, the trajectory 120 may depend upon one or more of the map elements identified in the two-dimensional map. For example, trajectories generated for the vehicle may be based at least in part on traffic signage and may be bounded by a portion of the map data indicated (by a map element) as being a drivable surface, except in exigent circumstances or pickup/drop-off/parking scenarios where the vehicle may generate a trajectory that will result in the vehicle moving into a portion of the environment indicated in the map data as being associated with a cycling lane, parking region, pickup/drop-off area, or the like.

The trajectory 120 may comprise instructions for controller(s) 116 to actuate drive components of the vehicle 102 to effectuate a steering angle, steering rate, acceleration, and/or the like, which may result in a vehicle position, vehicle velocity, and/or vehicle acceleration. For example, the trajectory 120 may comprise a target heading, target steering angle, target steering rate, target position, target velocity, and/or target acceleration for the controller(s) 116 to track. In some examples, the trajectory 120 may be associated with controls sufficient to control the vehicle 102 over a time horizon (e.g., 5 milliseconds, 10 milliseconds, 100 milliseconds, 200 milliseconds, 0.5 seconds, 1 second, 2 seconds, etc.) or a distance horizon (e.g., 1 meter, 2 meters, 5 meters, 8 meters, 10 meters). In some examples, the controller(s) 116 may comprise software and/or hardware for actuating drive components of the vehicle 102 sufficient to track the trajectory 120. For example, the controller(s) 116 may comprise one or more proportional-integral-derivative (PID) controllers.

In some examples, the perception component 110 may receive sensor data from the sensor(s) 104 and determine data related to objects in the vicinity of the vehicle 102 (e.g., classifications associated with detected objects, instance segmentation(s), semantic segmentation(s), two and/or three-dimensional bounding boxes, tracks), route data that specifies a destination of the vehicle, global map data that identifies characteristics of roadways (e.g., features detectable in different sensor modalities useful for localizing the autonomous vehicle), a pose of the vehicle (e.g. position and/or orientation in the environment, which may be determined by or in coordination with a localization component), local map data that identifies characteristics detected in proximity to the vehicle (e.g., locations and/or dimensions of buildings, trees, fences, fire hydrants, stop signs, and any other feature detectable in various sensor modalities), etc.

In particular, the perception component 110 may determine, based at least in part on sensor data, an object detection indicating an association of a portion of sensor data with an object in the environment. The object detection may indicate an object classification, a region of interest (ROI) identifying a portion of sensor data associated with the object, and/or a confidence score indicating a likelihood (e.g., posterior probability) that the object classification is correct and/or a confidence score that the ROI is accurate. For example, the ROI may include a portion of an image or radar data identified by an ML model or ML pipeline of the perception component 110 as being associated with the object, such as using a bounding box, mask, an instance segmentation, and/or a semantic segmentation. The object classifications determined by the perception component 110 may distinguish between different object types such as, for example, a passenger vehicle, a pedestrian, a bicyclist, a delivery truck, a semi-truck, traffic signage, and/or the like. In some examples, object detections may be tracked over time. For example, a track may associate two object detections generated at two different times as being associated with a same object and may comprise a historical, current, and/or predicted object position, velocity, acceleration, and/or heading of that object.

The data produced by the perception component 110 may be collectively referred to as perception data. Once the perception component 110 has generated perception data, the perception component 110 may provide the perception data to the planning component 112. The perception data may additionally or alternatively be stored in association with the sensor data as log data. This log data may be transmitted to the localization and/or mapping component 114, which may execute on the computing device(s) 106 and/or at a remote computing device (unillustrated in FIG. 1 for clarity).

The planning component 112 may use the perception data received from perception component 110, to determine one or more trajectories, control motion of the vehicle 102 to traverse a path or route, and/or otherwise control operation of the vehicle 102, though any such operation may be performed in various other components (e.g., localization may be performed by a localization component, which may be based at least in part on perception data). For example, the planning component 112 may determine a route for the vehicle 102 from a first location to a second location; generate, substantially simultaneously and based at least in part on the perception data and/or simulated perception data (which may further include predictions regarding detected objects in such data), a plurality of potential trajectories for controlling motion of the vehicle 102 in accordance with a receding horizon technique (e.g., 1 micro-second, half a second) to control the vehicle to traverse the route (e.g., in order to avoid any of the detected objects); and select one of the potential trajectories as a trajectory 120 of the vehicle 102 that may be used to generate a drive control signal that may be transmitted to drive components of the vehicle 102. FIG. 1 depicts an example of such a trajectory 120, represented as an arrow indicating a heading, velocity, and/or acceleration, although the trajectory itself may comprise instructions for controller(s) 116, which may, in turn, actuate a drive system of the vehicle 102.

In the depicted example, the perception component 110 may detect, based at least in part on sensor data (such as lidar data 122, although additional or alternate types of sensor data may be used), an object detection that may be used to generate a map element 124. The vehicle 102 may detect the object detection to generate the map element 124 as the vehicle executes trajectory 120 and passes through this portion of the environment. In some examples, determining the location and/or extents of the map element 124 may be based at least in part on the perception component 110 generating object detections associated with a portion of the environment that will become map element 124 from different poses of the vehicle 102 as the vehicle 102 traverses the environment. For example, vehicle 102 may generate a first object detection associated with map element 124 at pose 126 and a second object detection associated with the map element 124 at pose 128. A pose may comprise a heading and position.

For example, pose 130 comprises position 132 and heading 134. A localization component of the localization and/or mapping component 114 may determine the position and heading of the vehicle and this vehicle pose may be used by the perception component 110 to determine a relative heading and position of an object detection. The mapping portion of a localization and/or mapping component 114 may add a location of an object in an environment to a map, which may include a position, extents, and/or a classification (e.g., signage, roadway, static object, building) of map element 124. The position and/or extents of a map element may be determined based at least in part on object detections associated with the map element 124 generated by the perception component 110 while the vehicle 102 was at pose 126 and pose 128, to give an example. In some examples, object detections from different poses may be used to triangulate or otherwise determine an object's location and/or extents.

In some examples, the localization component of a localization and/or mapping component 114 may determine a pose graph comprising one or more poses estimated by the vehicle as part of simultaneous localization and mapping (SLAM) techniques executed by a localization component of the mapping component. The SLAM techniques may comprise a Bayesian filter (such as a Kalman filter), bundle adjustment, maximum a posteriori estimation (MAP), and/or any simultaneous localization and mapping (SLAM) algorithm. The noise model 118 may be used as part of any of the SLAM techniques discussed above as part of the pose graph optimization.

Estimating a pose node associated with a pose of the vehicle may include modifying a first estimated pose to increase a fit of/reduce the distance between a subset of lidar points of a first set of lidar points from a subset of lidar points of a second set of lidar points associated with a second estimated pose. A factor (constraint) between two poses may also be modified to fit the sets of sensor data together (e.g., by reducing the distance between lidar points of the two sets). The factor between these two estimated poses may be a constraint that identifies how the vehicle moved from one pose to the other. A covariance output by the noise model 118 may be associated with a pose and/or factor and may be used as part of the pose graph or factor graph optimization, depending on the use case.

In some examples, the estimated poses and factors therebetween may be based at least in part on the sensor data (e.g., lidar data) and/or ancillary sensor data, such as inertial measurement unit (IMU) sensor data, odometry data (e.g., which may be based at least in part on data received from wheel encoder or other sensors), and/or the like. For example, the vehicle may use IMU data and/or odometry data to instantiate the pose estimates and/or a factor between two pose estimates and may refine these initial estimates using the lidar data. The resultant pose graph may be a graph whose nodes correspond to the poses of the vehicle at different points in space and whose edges represent constraints between the poses. The latter are obtained from observations of the environment or from movement actions carried out by the robot.

Note that, as used herein, a pose graph may include a factor graph that comprises pose nodes and edges (factors/constrains), where a node indicates a pose (i.e., position and orientation (e.g., two- or three-dimensional heading) of the vehicle within the environment/map) of the vehicle and an edge (also called a factor) indicates a set of constraints that define a relation of one pose (node) to another pose (node). In some examples, a confidence score, such as a covariance, may be associated with an edge. In some examples, the vehicle may determine a pose graph based at least in part on sensor data, including odometry data and/or inertial data. In some examples, a pose node may be associated with sensor data received by the vehicle over a time window.

In some examples, the factor/constraint (illustrated as arrows between the nodes in FIG. 1) between two pose nodes may identify a translation and/or rotation between a first pose node and a second pose node and a covariance associated therewith that indicates how likely the constraint is correct in any number or combination of variables. For example, the constraint may identify a distance between, steering data or difference in headings, and/or the like that may define how a vehicle in the first pose would come to arrive at the second pose. In some examples, the constraint may additionally or alternatively include a time component, such as may be indicated by a velocity and/or acceleration. In some examples, a first covariance determined by the noise model 118 may be associated with the constraint indicating a likelihood that the constraint is correct, and a second covariance determined by the noise model 118 may be associated with the association of two pose nodes indicating a likelihood that the two pose nodes are associated with sensor data that was collected at those nodes and that the sensor data indicates at least a portion of the environment that is the same. In some examples, this association may be a closed-loop factor, although in other examples this may not be the case, such as where the association factor merely identifies that two poses are near enough to be associated with sensor data that includes the same object detections.

In some examples, the vehicle 102 may transmit object detection(s) and/or sensor data to a remote computing device in association with a pose graph. The sensor data, object detection(s), and/or pose graph may be used by the remote computing device to determine map data associated with an environment. In some examples, the noise model may 118 may be stored at the vehicle 102 and/or at the remote computing device. As discussed herein, the noise model 118 may be one among two or more noise models associated with different sensor modalities, environment conditions, and/or sensor models or unique sensors.

In some examples, the techniques discussed herein for adjusting a noise model may result in determining an updated noise model. This updated noise model may include a scalar or tensor that may be applied to the output of the noise model. such alteration of the output of the noise model may modify a former noise associated with an estimated state determined by a system that uses the noise model. In the depicted example, the error output by the noise model is depicted as a dashed circle 136 around map element 124, representing the uncertainty of the sensor data that feeds the SLAM optimizer (which may be based in part on the error estimate output by the noise model 118), upon which the series of poses depicted in FIG. 1 are determined by the SLAM optimizer. After the noise model has been adjusted according to the techniques discussed herein, the error output by the noise model is depicted as a dash circle 138 around updated map element 140, which corresponds with former map element 124 after the object detections have been re-optimized using the new (adjusted) noise model outputs.

Overall, the re-optimization of the pose graph using the adjusted noise model outputs may result in a correction 142 of one or more poses and/or factors/trajectories therebetween in the pose graph. This update to the pose graph may in turn cause corrections and/or adjustments to map elements determined based on the pose graph, such as updating a location and/or extents of map element 124, resulting in updated map element 140, and/or updates to a pose graph, resulting in updated pose 144. In some examples, the pose graph may be used to generate map data and/or to generate a representation 146 of the environment, such as a wire frame model (as depicted in FIG. 1), mesh, polygons, surfels (e.g., polygons associated with individual color and/or intensity), and/or the like representing a two- or three-dimensional representation of the environment.

In some examples, the updated noise model may be transmitted to the vehicle 102 to replace a former noise model and/or may replace a former noise model at a remote computing device.

Example Process

FIG. 2 illustrates a flow diagram of an example process 200 for adjusting a noise model to account for overfitting and/or to unify the covariances output by multiple noise models. In particular, example process 200 may be used to refine a noise model used as part of a SLAM technique for localizing the vehicle, which may include determining a pose graph and/or factor graph; as part of a Kalman filter; or another measurement model or prediction model that incorporates a noise model. Note that, the discussion herein largely regards noise models for sensors, but it is understood that a noise model discussed herein may be generated for a software output, such as any of the outputs generated by the perception and/or localization component(s), such as an object detection, object track, object prediction, or the like. The technique described herein may result in causing the residuals associated with the different noise models for the different sensors/sensor types/software components to be unit normal or near unit normal (e.g., having a variance that is less than a threshold variance that is near 1, such as 1.05, 1.1, 1.11, 1.2, or the like).

At operation 202, example process 200 may comprise determining an initial set of noise models comprising a first noise model associated with a first individual sensor or sensor type (e.g., plurality of sensors of a same sensor modality) and a second noise model associated with a second individual sensor or sensor type. In some examples, determining the first noise model and the second noise model at operation 202 may comprise an initial estimation of the respective models. For example, operation 202 may further comprise receiving first sensor data from a first individual sensor, sensor type, or software output (depending on the implementation) and second sensor data from a second sensor/sensor type/software. In some examples, the two different sensor types may be two different sensor modalities (e.g., lidar and radar, radar and visible light camera, lidar and infrared camera, or any other modalities), two different types of a same modality (e.g., solid state lidar and mechanical lidar), and/or two different sensor models. It is contemplated that more than two sensors/sensor types/software and/or combination thereof may be used in practice. In some examples, an estimation of the noise model for the first sensor data may be used to generate an estimated noise model.

For example, generating the first noise model may include using least squares parameter estimation to determine the noise model, although any other noise model parameter estimator may be used. Noise is inherent in any sensor measurement, and a sensor measurement may be represented according to the following equation:

$$y = X\beta + \epsilon \tag{1}$$

where y a measurement received from a sensor, X is a matrix representing feature(s) of the sensor (i.e., the system matrix), β are the coefficients associated with the features, and ε is noise associated with the sensor measurement. Generating the first noise model seeks to model the error term, ε, without access to ground truth data about the true error. In some examples, the noise model may comprise a Gaussian distribution or a Gaussian mixture model, having a variance defined by parameters determined according to the noise model estimation (e.g., least squares regression).

At operation 204, example process 200 may comprise determining, by a first optimization using the initial set of noise models or an updated set of noise models (for further iterations of example process 200, such as following the "No" prong from operation 214) and the covariances associated therewith, a process output. The process output depends entirely on the system into which the noise models are integrated. For example, if the noise models are being determined for a SLAM system, the process output may comprise a factor graph, a pose (position and/or orientation) of the vehicle, and/or a map; for a Kalman filter, the process output may comprise a predicted state of a component of the vehicle or of an object in the vehicle's environment; etc. Determining this process output may be part of a first optimization, such as a global solver for factor graph optimization, sensor data fusion, map generation, state prediction, and/or the like.

Operation 204 may be based at least in part on the set of covariances associated with the set of noise models. In some examples, determining the set of covariances may be part of operation 202. Regardless, the set of covariances may be represented as a covariance matrix that identifies, in a portion of the covariance matrix, such as a column, a portion of the covariance matrix/covariance(s) that are associated with a specific noise model. In some examples, each noise model may have a covariance matrix associated with it. The covariances may be used as a constraint as part of the optimization carried out in operation 204. Systems that rely on measurements from a sensor may rely on a measurement output by a noise model that estimates how reliable the measurement is. Such noise models thereby seek to model the error:

$$\epsilon \sim \mathcal{N}(0, \Sigma) \tag{2}$$

According to the discussion herein, Σ may represent the covariance(s) determined in association with all the noise models and, according to the techniques discussed herein, may be modified by a scalar as follows:

$$\Sigma = s_1 \Sigma_1 + \ldots + s_m \Sigma_m \tag{3}$$

where $s_i$ are the unknown parameters that the technique discussed herein may determine, $\Sigma_i$ is the covariance or covariance matrix associated with the i-th noise model, and m is the number of different sensors/sensor types/software components.

At operation 206, example process 200 may comprise determining, based at least in part on determining the process output, a set of residuals. For example, determining the process output may be done by an optimization algorithm that determines the process output by determining a solution that is subject to constraints determined based at least in part on to raw data, such as sensor data and/or perception component outputs, and that minimizes residuals determined in association with the process output. For example, a residual may be determined based at least in part on an extent to which a portion of the process output violates a constraint or is different than a measurement. In other words, the residual indicates how well the process output fits the measurements indicated in the sensor data and/or perception data.

At operation 208, example process 200 may comprise determining a whitened set of noise models by whitening the first noise model, the second noise model, and the set of covariances. For example, whitening the first noise model may comprise dividing the noise model by dividing the first noise model and the portion of the covariance(s) associated with the first noise model by the standard deviation of the first noise model (i.e., the square root of the portion of the covariance(s) associated with the first noise model). The resultant noise model thereby indicates noise in units in terms of standard deviation, rather than the native units of the noise model. Additional and alternative examples for whitening a noise model and its covariance(s) may exist and may include solving the noise model such that the covariance(s) result in an identity matrix. In some examples, the whitening operation may be skipped.

At operation 210, example process 200 may comprise determining, using a hat matrix determined based at least in part on the first optimization and residual(s) of the first optimization, a first adjustment to the first noise model and a second adjustment to the second noise model. Operation 210 may determine additional adjustments for all of the remaining noise models in the set of noise models and may be accomplished on either the set of noise models or the whitened set of noise models and their whitened covariances. In some examples, the adjustment to a noise model may comprise a scalar that may be applied to the covariance(s) associated with the noise model. The following description provides examples for how to determine these scalars for all the noise models, jointly, without needing canonic data about the true error for both whitened and unwhitened noise models/covariances.

The residuals of the first optimization may be given by:

$$r = (1 - H)\epsilon \tag{4}$$

where H is the hat matrix of the linear regression of y against X (see equation (1)), the diagonal elements of which define the leverage of the system that produces the process output at operation 204. The hat matrix may be given by $H=X(X^TX)^{-1}X^T$, which in other instances may be used to determine the fitted or predicted values $\hat{y}=Hy=X\beta$.

To determine the parameter(s) for modifying m unwhitened noise models, using the residuals from the first optimization and the hat matrix, the expectation of the sum of squared values of the residuals may be used, which may be given by:

$$\mathbb{E}[rr^T]=s_1(1-H)\Sigma_1(1-H)+\ldots+s_m(1-H)\Sigma_m(1-H) \qquad (5)$$

where $s_1$ is the first scalar that may be applied to the first covariance(s), $\Sigma_1$, associated with the first noise model (see equation (3)). To determine the parameters using this equation, the expectation may be determined based at least in part on the residuals (i.e., by determining the second moment of the residuals), allowing equation (5) to be solved for the parameters, $s_i$, as a system of equations. Simplifying, equation (5) may be written as:

$$r_ir_j=s_1((1-H)\gamma_1(1-H))_{ij}+\ldots+s_m((1-H)\Sigma_m(1-H))_{ij}+E_{ij} \qquad (6)$$

where $E_{ij}$ are the error terms output by the noise models and the $E_{ij}$ has zero mean. Equation (6) thereby provides an unbiased estimator of the parameters $s_i$ by regressing $rr^T$ against $1-H$.

In yet another example where the noise models/residuals are whitened the covariances associated with the different noise models, $\Sigma_i$ of equation (3), may be a diagonal matrix with ones on diagonal entries corresponding to sensor modalities of the i-th type and zero on all other diagonal entries. Similarly to the non-whitened case, the expectation of the residuals may be determined and the parameters, $s_i$, for the different noise models may be solved for as the following system of equations since the expectation is equal to the sum of squared residuals for the i-th sensor/sensor type/software component:

$$\mathbb{E}[r^T\Sigma_ir]=\langle\Sigma_i,\mathbb{E}[rr^T]\rangle=\Sigma_js_j\langle(\Sigma_i,(1-H)\Sigma_j(1-H)\rangle=\Sigma_js_j\langle(1-H)\Sigma_i(1-H),(1-H)\Sigma_j(1-H)\rangle \qquad (9)$$

Where the second equality follows from the residual covariance discussed above and the third equality is a short calculation involving the idempotence of (1-H) and the cyclic property of the trace. In some examples, since the residuals have been whitened the standard deviation of the residuals may approach or equal 1.

At operation 212, example process 200 may comprise determining an updated set of noise models by adjusting the set of noise models using the adjustments determined at operation 210. For example, operation 214 may include scaling each set of covariances associated with a respective error model by the scalar determined for that error model at operation 210. The covariances, $\Sigma_1$, associated with the first error model may be scaled by parameter $s_1$ to determine an updated first error model/first error model covariance, and so on.

At operation 214, example process 200 may comprise determining whether the adjustments are converging or whether an end condition has been satisfied. For example, operations 204-212 may be repeated as part of a second optimization and operation 214 may comprise determining whether a standard deviation of the residuals are converging towards 1 (unary variance) and/or determining whether the scalars determined by iteratively repeating operations 204-212 are converging. Operation 214 may comprise determining whether the residuals of a noise model have unit variance or near unit variance (i.e., the covariances output by the noise model have a standard deviation of 1 or close to 1, which may mean having a standard deviation that is less than a threshold deviation, such as 1.1, 1.2, or another number close to 1). This process of making the residuals unary (having unit variance) ensures that the error outputs of noise model(s) associated with different sensor types are coordinated and cohesive. By adjusting the noise model covariances into having a same or similar residual distribution, the covariances generated by the noise models are more cohesive and meaningful for prediction and/or planning component(s) and the like that rely on such covariances.

If the residuals do not have a standard deviation of 1 or close to 1 (e.g., which may be determined by determining whether the standard deviation of the residuals is less than a threshold residual) or if the adjustments haven't finished converging, example process 200 may return to operation 204 ("No" prong) to repeat operations 204-212 with the newly updated noise models using the parameters determined at the previous iteration of operation 210. This process may be repeated until the standard deviation converges, has a difference from 1 that is less than a threshold difference, or equals 1.

Additionally or alternatively, operation 214 may determine whether an end condition has been satisfied, such as determining whether a set number of iterations has been reached, the adjustments are less than a threshold adjustment, an amount of time has passed, a cloud computing compute allocation has been reached, or the like. If an end condition hasn't been reached, example process 200 may return to operation 204 ("No" prong) to repeat operations 204-212.

If the standard deviation of the residuals converges, is less than a threshold standard deviation, has a difference from 1 that is less than a threshold difference, or equals 1; if the adjustments converge; or if an end condition is satisfied example process 200 may continue to operation 216 ("Yes" prong).

At operation 212, example process 200 may comprise transmitting updated noise models to a vehicle and/or putting updated noise models in production on a remote computing device. For example, updating the noise model may comprise scaling the covariance(s) associated with a noise model by the parameter(s) determined according to example process 200. The vehicle or remote computing device may then use the updated noise model to determine a pose graph, factor graph, map data, or the like using the updated noise model and/or sensor data.

In some examples, example process 200 may be repeated for different combinations of sensors (e.g., one version of sensor fusion may not use IMU data, so example process 200 may be completed without including an IMU error model/covariances) and/or for different environment conditions and/or environs.

Example System

Figure 3:

FIG. 3 illustrates a block diagram of an example system that incorporates a noise model for generating a process output, as discussed at operation 204, as may be used in a measurement model, prediction model, or the like. The illustrated example uses a pose graph as an example of a process output that may be determined using the noise models discussed herein, although it is understood the multiple different kinds of systems may use noise models, such as localization and/or mapping components, vehicle component state estimators, Kalman filters, and the like. The system 300 may comprise sensor(s) 302, which may be sensors of different types, all of which individually generate and contribute to sensor measurements 304. Note that, although sensor measurements 304 are discussed herein, the data used by the optimization component 306 may additionally or alternatively perception and/or prediction data that is generated by the perception component based at least in part on sensor data.

The sensor measurements 304 may be provided as input to optimization component 306, which may be a global solver, Kalman filter, or the like that generates the process output (i.e., pose graph 318 in this example). Many instances of such an optimization include a system model or process model 308 (given as X above) that may generate a set of factor(s) 310 based at least in part on the sensor measurements 304, in a pose graph example. The factor(s) 310 may be constraints used for the optimization solver that are based on observed measurements indicated by the sensor measurements 304. The noise models 312 for the different sensor(s) 302 may use the factor(s) 310 and/or sensor measurements 304 to determine estimated errors 316 associated with each of the sensor measurements 304 and/or factor(s) 310.

These estimated errors may further be associated with a set of covariance(s) 314 associated with the noise models 312 that may be determined as discussed herein. Wherein first covariance(s) of the set of covariance(s) 314 may be associated with a first noise model of the noise models (and a first sensor/sensor type/software component), second covariance(s) of the set of covariance(s) 314 may be associated with a second noise model of the noise models 312 (and a second sensor/sensor type/software component), and so on. The optimization 306 may determine a pose graph 318 based at least in part on the sensor measurements 304, factor(s) 310, and/or the estimated errors 316, such as by seeking to minimize residuals 320 without violating constraints imposed by factor(s) 310 and based at least in part on the set of covariance(s) 314, which indicate how much each factor can be flexed. In other words, together, the error models and covariance(s) define an amount of tolerance for the constraints and a confidence that such tolerance is permissible. The residuals 320 may be determined by the optimization component 306 as part of generating the process output, the pose graph.

These residuals 320 and a hat matrix computed based at least in part on the process model 308 may be provided as input to a noise model tuning component 322, which may execute process 200 to determine parameter(s) 324 for tuning the set of covariance(s) 314. Parameter(s) 324 determined as part of an intermediate iteration of example process 200 may scale the set of covariance(s) 314 as part of the iterative process in example process 200 and, after completion of the tuning operation described regarding example process 200, finalized parameter(s) 324 may scale the set of covariance(s) 314.

Example System

Figure 4:
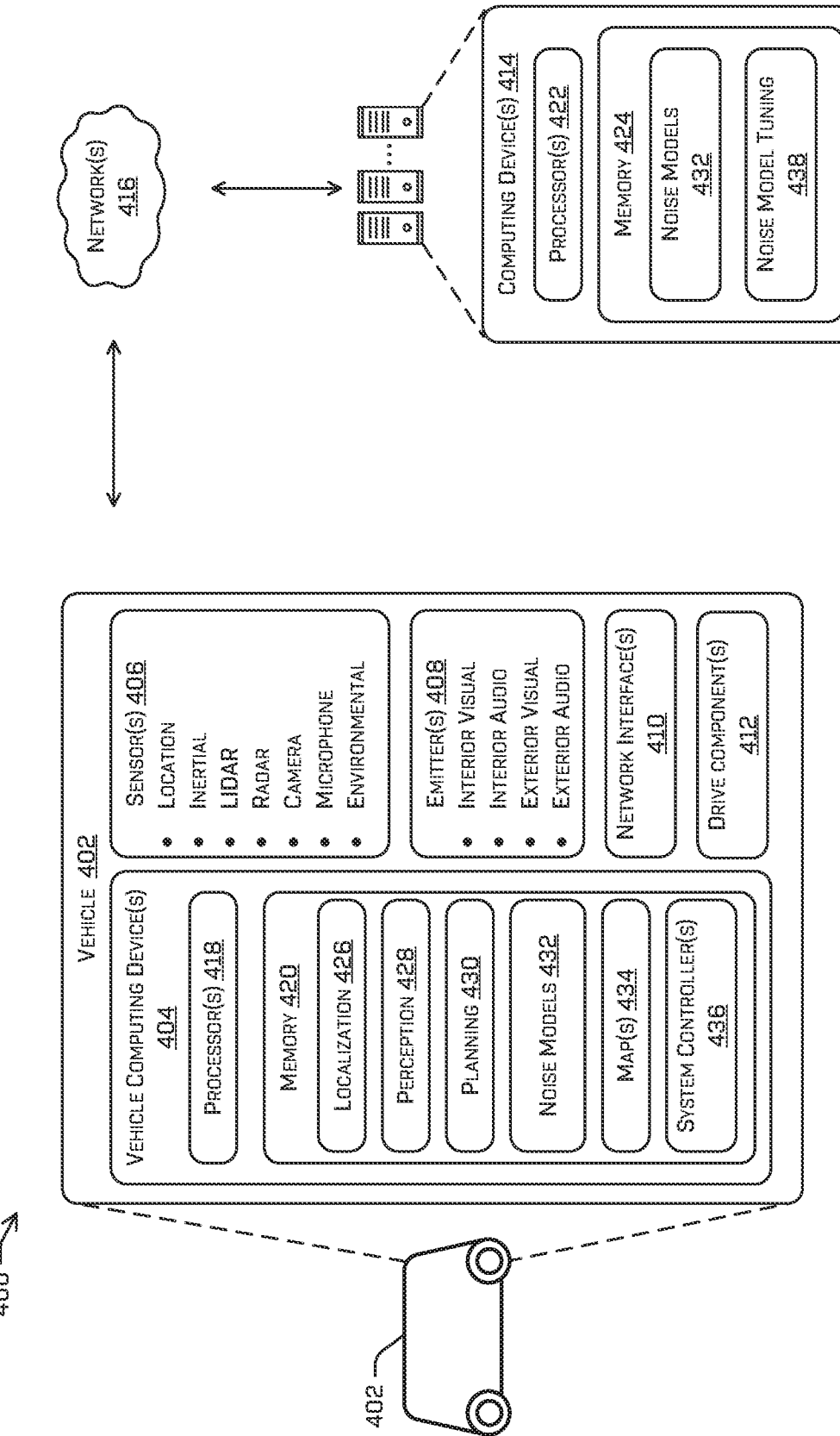

FIG. 4 illustrates a block diagram of an example system 400 that implements the techniques discussed herein. In some instances, the example system 400 may include a vehicle 402, which may represent the vehicle 102 in FIG. 1. In some instances, the vehicle 402 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the vehicle 402 may be a fully or partially autonomous vehicle having any other level or classification. Moreover, in some instances, the techniques described herein may be usable by non-autonomous vehicles as well.

The vehicle 402 may include a vehicle computing device(s) 404, sensor(s) 406, emitter(s) 408, network interface(s) 410, and/or drive component(s) 412. Vehicle computing device(s) 404 may represent computing device(s) 106 and sensor(s) 406 may represent sensor(s) 104. The system 400 may additionally or alternatively comprise computing device(s) 414.

In some instances, the sensor(s) 406 may represent sensor(s) 104 and may include lidar sensors, radar sensors, ultrasonic transducers, sonar sensors, location sensors (e.g., global positioning system (GPS), compass, etc.), inertial sensors (e.g., inertial measurement units (IMUs), accelerometers, magnetometers, gyroscopes, etc.), image sensors (e.g., red-green-blue (RGB), infrared (IR), intensity, depth, time of flight cameras, etc.), microphones, wheel encoders, environment sensors (e.g., thermometer, hygrometer, light sensors, pressure sensors, etc.), etc. The sensor(s) 406 may include multiple instances of each of these or other types of sensors. For instance, the radar sensors may include individual radar sensors located at the corners, front, back, sides, and/or top of the vehicle 402. As another example, the cameras may include multiple cameras disposed at various locations about the exterior and/or interior of the vehicle 402. The sensor(s) 406 may provide input to the vehicle computing device(s) 404 and/or to computing device(s) 414.

The vehicle 402 may also include emitter(s) 408 for emitting light and/or sound, as described above. The emitter(s) 408 in this example may include interior audio and visual emitter(s) to communicate with passengers of the vehicle 402. By way of example and not limitation, interior emitter(s) may include speakers, lights, signs, display screens, touch screens, haptic emitter(s) (e.g., vibration and/or force feedback), mechanical actuators (e.g., seatbelt tensioners, seat positioners, headrest positioners, etc.), and the like. The emitter(s) 408 in this example may also include exterior emitter(s). By way of example and not limitation, the exterior emitter(s) In this example include lights to signal a direction of travel or other indicator of vehicle action (e.g., indicator lights, signs, light arrays, etc.), and one or more audio emitter(s) (e.g., speakers, speaker arrays, horns, etc.) to audibly communicate with pedestrians or other nearby vehicles, one or more of which comprising acoustic beam steering technology.

The vehicle 402 may also include network interface(s) 410 that enable communication between the vehicle 402 and one or more other local or remote computing device(s). For instance, the network interface(s) 410 may facilitate communication with other local computing device(s) on the vehicle 402 and/or the drive component(s) 412. Also, the network interface(s) 410 may additionally or alternatively allow the vehicle to communicate with other nearby computing device(s) (e.g., other nearby vehicles, traffic signals, etc.). The network interface(s) 410 may additionally or alternatively enable the vehicle 402 to communicate with computing device(s) 414. In some examples, computing device(s) 414 may comprise one or more nodes of a distributed computing system (e.g., a cloud computing architecture).

The network interface(s) 410 may include physical and/or logical interfaces for connecting the vehicle computing device(s) 404 to another computing device or a network, such as network(s) 416. For example, the network interface(s) 410 may enable Wi-Fi-based communication such as via frequencies defined by the IEEE 400.11 standards, short range wireless frequencies such as Bluetooth®, cellular communication (e.g., 2G, 6G, 4G, 4G LTE, 5G, etc.) or any suitable wired or wireless communications protocol that enables the respective computing device to interface with the other computing device(s). In some instances, the vehicle computing device(s) 404 and/or the sensor(s) 406 may send sensor data, via the network(s) 416, to the computing device(s) 414 at a particular frequency, after a lapse of a predetermined period of time, in near real-time, etc.

In some instances, the vehicle 402 may include one or more drive components 412. In some instances, the vehicle 402 may have a single drive component 412. In some instances, the drive component(s) 412 may include one or more sensors to detect conditions of the drive component(s) 412 and/or the surroundings of the vehicle 402. By way of example and not limitation, the sensor(s) of the drive component(s) 412 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, lidar sensors, radar sensors, etc. Some sensors, such as the wheel encoders may be unique to the drive component(s) 412. In some cases, the sensor(s) on the drive component(s) 412 may overlap or supplement corresponding systems of the vehicle 402 (e.g., sensor(s) 406).

The drive component(s) 412 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 412 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 412. Furthermore, the drive component(s) 412 may also include one or more communication connection(s) that enable communication by the respective drive component with one or more other local or remote computing device(s).

The vehicle computing device(s) 404 may include processor(s) 418 and memory 420 communicatively coupled with the one or more processors 418. Memory 420 may represent memory 108. Computing device(s) 414 may also include processor(s) 422, and/or memory 424. The processor(s) 418 and/or 422 may be any suitable processor capable of executing instructions to process data and perform operations as described herein. By way of example and not limitation, the processor(s) 418 and/or 422 may comprise one or more central processing units (CPUs), graphics processing units (GPUs), integrated circuits (e.g., application-specific integrated circuits (ASICs)), gate arrays (e.g., field-programmable gate arrays (FPGAs)), and/or any other device or portion of a device that processes electronic data to transform that electronic data into other electronic data that may be stored in registers and/or memory.

Memory 420 and/or 424 may be examples of non-transitory computer-readable media. The memory 420 and/or 424 may store an operating system and one or more software applications, instructions, programs, and/or data to implement the methods described herein and the functions attributed to the various systems. In various implementations, the memory may be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

In some instances, the memory 420 and/or memory 424 may store a localization component 426, perception component 428, planning component 430, noise models 432, map(s) 434, and/or system controller(s) 436. Perception component 428 may represent perception component 110, planning component 430 may represent planning component 112, and/or noise models 432 may represent noise model 118, noise models determined by example process 200, and/or noise models 312. Memory 424 may store noise models 432 and/or noise model tuning component 438, which may represent noise model tuning component 322. In some examples, memory 424 may additionally or alternatively store optimization component 306, process model 308, and/or pose graph 318.

In at least one example, the localization component 426 may include hardware and/or software to receive data from the sensor(s) 406 to determine a position, velocity, and/or orientation of the vehicle 402 (e.g., one or more of an x-, y-, z-position, roll, pitch, or yaw). For example, the localization component 426 may include and/or request/receive map(s) 434 of an environment and can continuously determine a location, velocity, and/or orientation of the autonomous vehicle within the map(s) 434. In some instances, the localization component 426 may utilize SLAM (simultaneous localization and mapping), CLAMS (calibration, localization and mapping, simultaneously), relative SLAM, bundle adjustment, non-linear least squares optimization, and/or the like to receive image data, lidar data, radar data, IMU data, GPS data, wheel encoder data, and the like to accurately determine a location, pose, and/or velocity of the autonomous vehicle. In some instances, the localization component 426 may provide data to various components of the vehicle 402 to determine an initial position of an autonomous vehicle for generating a trajectory and/or for generating map data, as discussed herein. In some examples, localization component 426 may provide, to a mapping component (which may be a part of localization component 426 or a different component altogether), a location and/or orientation of the vehicle 402 relative to the environment and/or sensor data associated therewith. In some examples, the localization component 426 may generate a preliminary pose graph and may associate a pose node with a window of sensor data in log data stored at memory 420. This log data (including the preliminary pose graph) may be transmitted to computing device(s) 414 over network(s) 416.

In some instances, perception component 428 may comprise a primary perception system and/or a prediction system implemented in hardware and/or software. The perception component 428 may detect object(s) in in an environment surrounding the vehicle 402 (e.g., identify that an object exists), classify the object(s) (e.g., determine an object type associated with a detected object), segment sensor data and/or other representations of the environment (e.g., identify a portion of the sensor data and/or representation of the environment as being associated with a detected object and/or an object type), determine characteristics associated with an object (e.g., a track identifying current, predicted, and/or previous position, heading, velocity, and/or acceleration associated with an object), and/or the like. Data determined by the perception component 428 is referred to as perception data.

The planning component 430 may receive a location and/or orientation of the vehicle 402 from the localization component 426 and/or perception data from the perception component 428 and may determine instructions for controlling operation of the vehicle 402 based at least in part on any of this data. In some examples, determining the instructions may comprise determining the instructions based at least in part on a format associated with a system with which the instructions are associated (e.g., first instructions for controlling motion of the autonomous vehicle may be formatted in a first format of messages and/or signals (e.g., analog, digital, pneumatic, kinematic) that the system controller(s) 436 and/or drive component(s) 412 may parse/cause to be carried out, second instructions for the emitter(s) 408 may be formatted according to a second format associated therewith).

Although localization component 426, perception component 428, planning component 430, map(s) 434, and/or system controller(s) 436 are illustrated as being stored in memory 420, any of these components may include processor-executable instructions, machine-learned model(s) (e.g., a neural network), and/or hardware and all or part of any of these components may be stored on memory 424 or configured as part of computing device(s) 414.

As described herein, the localization component 426, the perception component 428, the planning component 430, noise models 432, noise model tuning component 438, and/or other components of the system 400 may comprise one or more ML models. For example, the localization component 426, the perception component 428, and/or the planning component 430 may each comprise different ML model pipelines. In some examples, an ML model may comprise a neural network. An exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine-learning, which can refer to a broad class of such algorithms in which an output is generated based on learned parameters.

Although discussed in the context of neural networks, any type of machine-learning can be used consistent with this disclosure. For example, machine-learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 6 (ID6), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, Hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet-50, ResNet-101, VGG, DenseNet, EfficientNet, PointNet, Xception, ConvNeXt, and the like or visual transformers (ViTs), such as a bidirectional encoder from image transformers (BEiT), visual bidirectional encoder from transformers (VisualBERT), image generative pre-trained transformer (Image GPT), data-efficient image transformers (DeiT), deeper vision transformer (DeepViT), convolutional vision transformer (CvT), detection transformer (DETR), Miti-DETR, or the like.

Memory 420 may additionally or alternatively store one or more system controller(s) 436, which may be configured to control steering, propulsion, braking, safety, emitters, communication, and other systems of the vehicle 402. These system controller(s) 436 may communicate with and/or control corresponding systems of the drive component(s) 412 and/or other components of the vehicle 402. For example, the planning component 430 may generate instructions based at least in part on perception data generated by the perception component 428, which a trajectory verification component (an unillustrated subcomponent of planning component 430) may validate and/or transmit to the system controller(s) 436. The system controller(s) 436 may control operation of the vehicle 402 based at least in part on the instructions received from the planning component 430. In some examples, these instructions may be based at least in part on map data generated according to the techniques discussed herein. In some examples, the trajectory verification component may replace instructions generated by the planning component 430 with alternate instructions associated with a contingent trajectory such as, for example, a contingent trajectory that may specify an alternate maneuver, and/or the like.

It should be noted that while FIG. 4 is illustrated as a distributed system, in alternative examples, components of the vehicle 402 may be associated with the computing device(s) 414 and/or components of the computing device(s) 414 may be associated with the vehicle 402. That is, the vehicle 402 may perform one or more of the functions associated with the computing device(s) 414, and vice versa.

Example Clauses

A. A method comprising: determining an initial set of noise models comprising a first noise model and a second noise model, wherein the first noise model is based at least in part on first sensor data from a first sensor of a first sensor modality and the second noise model is based at least in part on second sensor data from a second sensor of a second sensor modality; determining, based at least in part on the initial set of noise models and a set of covariances associated with the initial set of noise models, a process output, wherein determining the process output comprises determining a portion of the process output that reduces a residual of a set of residuals subject to constraints determined based at least in part on sensor data and tolerances set by the set of noise models and the set of covariances; jointly determining a first adjustment to the first noise model and a second adjustment to the second noise model based at least in part on the set of residuals and a hat matrix determined based at least in part on determining the process output; determining an updated set of noise models based at least in part on adjusting the set of noise models using the first adjustment and the second adjustment; and transmitting the updated set of noise models to a vehicle such that the vehicle controls motion of the vehicle based at least in part on the updated set of noise models.

B. The method of paragraph A, wherein determining the first adjustment comprises determining one or more scalars that may be applied to a first covariance or first covariance matrix associated with the first noise model to achieve an updated first noise model.

C. The method of either paragraph A or B, further comprising whitening first noise model and a first covariance or first covariance matrix associated with the first noise model.

D. The method of any one of paragraphs A-C, further comprising: associating the first updated noise model with the first sensor modality and a first environment state; and determining a third updated model associated with the first sensor modality; and associating the third updated model with a second environment state.

E. The method of any one of paragraphs A-D, further comprising iteratively: determining a new process output using the updated set of noise models, determining new residuals based at least in part on determining the new process output, and determining, as newly updated noise models, new alterations to the set of noise models based at least in part on the new residuals and the hat matrix until the adjustments converge, a difference between a standard deviation associated with the residuals and A is less than a threshold difference, or an end condition is satisfied.

F. The method of any one of paragraphs A-E, wherein determining the first adjustment to the first noise model and the second adjustment to the second noise model normalizes covariances associated with the first noise model and the second noise model such that covariances associated with the first noise model and the second noise model are normalized with respect to each other.

G. A system comprising: one or more processors; and a memory storing processor-executable instructions that, when executed by the one or more processors, cause the system to perform operations comprising: determining an initial set of noise models comprising a first noise model and a second noise model, wherein the first noise model is based at least in part on first sensor data from a first sensor of a first sensor modality and the second noise model is based at least in part on second sensor data from a second sensor of a second sensor modality; determining, based at least in part on the initial set of noise models and a set of covariances associated with the initial set of noise models, a process output, wherein determining the process output comprises determining a portion of the process output that reduces a residual of a set of residuals subject to constraints determined based at least in part on sensor data and tolerances set by the set of noise models and the set of covariances; jointly determining a first adjustment to the first noise model and a second adjustment to the second noise model based at least in part on the set of residuals and a hat matrix determined based at least in part on determining the process output; determining an updated set of noise models based at least in part on adjusting the set of noise models using the first adjustment and the second adjustment; and transmitting the updated set of noise models to a vehicle such that the vehicle controls motion of the vehicle based at least in part on the updated set of noise models.

H. The system of paragraph G, wherein determining the first adjustment comprises determining one or more scalars that may be applied to a first covariance or first covariance matrix associated with the first noise model to achieve an updated first noise model.

I. The system of either paragraph G or H, further comprising whitening first noise model and a first covariance or first covariance matrix associated with the first noise model.

J. The system of any one of paragraphs G-I, further comprising: associating the first updated noise model with the first sensor modality and a first environment state; and determining a third updated model associated with the first sensor modality; and associating the third updated model with a second environment state.

K. The system of any one of paragraphs G-J, further comprising iteratively: determining a new process output using the updated set of noise models, determining new residuals based at least in part on determining the new process output, and determining, as newly updated noise models, new alterations to the set of noise models based at least in part on the new residuals and the hat matrix until the adjustments converge, a difference between a standard deviation associated with the residuals and A is less than a threshold difference, or an end condition is satisfied.

L. The system of any one of paragraphs G-K, wherein determining the first adjustment to the first noise model and the second adjustment to the second noise model normalizes covariances associated with the first noise model and the second noise model such that covariances associated with the first noise model and the second noise model are normalized with respect to each other.

M. The system of any one of paragraphs G-L, wherein the first noise model and the second noise model are part of: a localization component, a simultaneous localization and mapping component, a Kalman filter, or a pose estimate component; and the process output comprises a vehicle pose, map, factor graph, pose graph, vehicle state or predicted state, or an object state or predicted state.

N. A non-transitory computer-readable medium storing processor-executable instructions that, when executed by one or more processors, cause the one or more processors to perform operations comprising: determining an initial set of noise models comprising a first noise model and a second noise model, wherein the first noise model is based at least in part on first sensor data from a first sensor of a first sensor modality and the second noise model is based at least in part on second sensor data from a second sensor of a second sensor modality; determining, based at least in part on the initial set of noise models and a set of covariances associated with the initial set of noise models, a process output, wherein determining the process output comprises determining a portion of the process output that reduces a residual of a set of residuals subject to constraints determined based at least in part on sensor data and tolerances set by the set of noise models and the set of covariances; jointly determining a first adjustment to the first noise model and a second adjustment to the second noise model based at least in part on the set of residuals and a hat matrix determined based at least in part on determining the process output; determining an updated set of noise models based at least in part on adjusting the set of noise models using the first adjustment and the second adjustment; and transmitting the updated set of noise models to a vehicle such that the vehicle controls motion of the vehicle based at least in part on the updated set of noise models.

O. The non-transitory computer-readable medium of paragraph N, wherein determining the first adjustment comprises determining one or more scalars that may be applied to a first covariance or first covariance matrix associated with the first noise model to achieve an updated first noise model.

P. The non-transitory computer-readable medium of either paragraph N or 0, further comprising whitening first noise model and a first covariance or first covariance matrix associated with the first noise model.

Q. The non-transitory computer-readable medium of any one of paragraphs N-P, further comprising: associating the first updated noise model with the first sensor modality and a first environment state; and determining a third updated model associated with the first sensor modality; and associating the third updated model with a second environment state.

R. The non-transitory computer-readable medium of any one of paragraphs N-Q, further comprising iteratively: determining a new process output using the updated set of noise models, determining new residuals based at least in part on determining the new process output, and determining, as newly updated noise models, new alterations to the set of noise models based at least in part on the new residuals and the hat matrix until the adjustments converge, a difference between a standard deviation associated with the residuals and A is less than a threshold difference, or an end condition is satisfied.

S. The non-transitory computer-readable medium of any one of paragraphs N-R, wherein determining the first adjustment to the first noise model and the second adjustment to the second noise model normalizes covariances associated with the first noise model and the second noise model such that covariances associated with the first noise model and the second noise model are normalized with respect to each other.

T. The non-transitory computer-readable medium of any one of paragraphs N-S, wherein the first noise model and the second noise model are part of: a localization component, a simultaneous localization and mapping component, a Kalman filter, or a pose estimate component; and the process output comprises a vehicle pose, map, factor graph, pose graph, vehicle state or predicted state, or an object state or predicted state.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
    determining a set of noise models comprising a first noise model and a second noise model, wherein the first noise model is based at least in part on first sensor data from a first sensor of a first sensor modality and the second noise model is based at least in part on second sensor data from a second sensor of a second sensor modality;
    determining, based at least in part on the set of noise models and a set of covariances associated with the set of noise models, a process output, wherein determining the process output comprises determining a portion of the process output that reduces a residual of a set of residuals subject to constraints determined based at least in part on sensor data and tolerances set by the set of noise models and the set of covariances;
    jointly determining a first adjustment to the first noise model and a second adjustment to the second noise model based at least in part on the set of residuals and a hat matrix determined based at least in part on determining the process output;
    determining an updated set of noise models based at least in part on adjusting the set of noise models using the first adjustment and the second adjustment; and
    transmitting the updated set of noise models to a vehicle such that the vehicle controls motion of the vehicle based at least in part on the updated set of noise models.

2. The method of claim 1, wherein determining the first adjustment comprises determining one or more scalars that may be applied to a first covariance or first covariance matrix associated with the first noise model to achieve an updated first noise model.

3. The method of claim 1, further comprising whitening the first noise model and a first covariance or a first covariance matrix associated with the first noise model.

4. The method of claim 1, wherein the updated set of noise models comprises a first updated noise model, the method further comprising:
    associating the first updated noise model with the first sensor modality and a first environment state;
    determining a third updated model associated with the first sensor modality; and
    associating the third updated model with a second environment state.

5. The method of claim 1, further comprising iteratively: determining a new process output using the updated set of noise models, determining new residuals based at least in part on determining the new process output, and determining, as newly updated noise models, new alterations to the set of noise models based at least in part on the new residuals and the hat matrix until the adjustments converge, a difference between a standard deviation associated with the new residuals and 1 is less than a threshold difference, or an end condition is satisfied.

6. The method of claim 1, wherein determining the first adjustment to the first noise model and the second adjustment to the second noise model normalizes covariances associated with the first noise model and the second noise model such that the covariances associated with the first noise model and the second noise model are normalized with respect to each other.

7. A system comprising:
    one or more processors; and
    one or more non-transitory memory storing processor-executable instructions that, when executed by the one or more processors, cause the system to perform operations comprising:
        determining a set of noise models comprising a first noise model and a second noise model, wherein the first noise model is based at least in part on first sensor data from a first sensor of a first sensor modality and the second noise model is based at least in part on second sensor data from a second sensor of a second sensor modality;
        determining, based at least in part on the set of noise models and a set of covariances associated with the set of noise models, a process output, wherein determining the process output comprises determining a portion of the process output that reduces a residual of a set of residuals subject to constraints determined based at least in part on sensor data and tolerances set by the set of noise models and the set of covariances;
        jointly determining a first adjustment to the first noise model and a second adjustment to the second noise model based at least in part on the set of residuals and a hat matrix determined based at least in part on determining the process output;
        determining an updated set of noise models based at least in part on adjusting the set of noise models using the first adjustment and the second adjustment; and
        transmitting the updated set of noise models to a vehicle such that the vehicle controls motion of the vehicle based at least in part on the updated set of noise models.

8. The system of claim 7, wherein determining the first adjustment comprises determining one or more scalars that may be applied to a first covariance or first covariance matrix associated with the first noise model to achieve an updated first noise model.

9. The system of claim 7, the operations further comprising whitening the first noise model and a first covariance or a first covariance matrix associated with the first noise model.

10. The system of claim 7, wherein the updated set of noise models comprises a first updated noise model, the operations further comprising:
    associating the first updated noise model with the first sensor modality and a first environment state;
    determining a third updated model associated with the first sensor modality; and
    associating the third updated model with a second environment state.

11. The system of claim 7, the operations further comprising iteratively: determining a new process output using the updated set of noise models, determining new residuals based at least in part on determining the new process output, and determining, as newly updated noise models, new alterations to the set of noise models based at least in part on the new residuals and the hat matrix until the adjustments converge, a difference between a standard deviation associated with the new residuals and 1 is less than a threshold difference, or an end condition is satisfied.

12. The system of claim 7, wherein determining the first adjustment to the first noise model and the second adjustment to the second noise model normalizes covariances associated with the first noise model and the second noise model such that the covariances associated with the first noise model and the second noise model are normalized with respect to each other.

13. The system of claim 7, wherein the first noise model and the second noise model are part of at least one of:

a localization component, a simultaneous localization and mapping component, a Kalman filter, or a pose estimate component; and the process output comprises at least one of a vehicle pose, map, factor graph, pose graph, vehicle state or predicted state, or an object state or predicted state.

14. A non-transitory computer-readable medium storing processor-executable instructions that, when executed by one or more processors, cause the one or more processors to perform operations comprising:

determining a set of noise models comprising a first noise model and a second noise model, wherein the first noise model is based at least in part on first sensor data from a first sensor of a first sensor modality and the second noise model is based at least in part on second sensor data from a second sensor of a second sensor modality;

determining, based at least in part on the set of noise models and a set of covariances associated with the set of noise models, a process output, wherein determining the process output comprises determining a portion of the process output that reduces a residual of a set of residuals subject to constraints determined based at least in part on sensor data and tolerances set by the set of noise models and the set of covariances;

jointly determining a first adjustment to the first noise model and a second adjustment to the second noise model based at least in part on the set of residuals and a hat matrix determined based at least in part on determining the process output;

determining an updated set of noise models based at least in part on adjusting the set of noise models using the first adjustment and the second adjustment; and transmitting the updated set of noise models to a vehicle such that the vehicle controls motion of the vehicle based at least in part on the updated set of noise models.

15. The non-transitory computer-readable medium of claim 14, wherein determining the first adjustment comprises determining one or more scalars that may be applied to a first covariance or first covariance matrix associated with the first noise model to achieve an updated first noise model.

16. The non-transitory computer-readable medium of claim 14, the operations further comprising whitening the first noise model and a first covariance or a first covariance matrix associated with the first noise model.

17. The non-transitory computer-readable medium of claim 14, wherein the updated set of noise models comprises a first updated noise model, the operations further comprising:

associating the first updated noise model with the first sensor modality and a first environment state;

determining a third updated model associated with the first sensor modality; and associating the third updated model with a second environment state.

18. The non-transitory computer-readable medium of claim 14, the operations further comprising iteratively: determining a new process output using the updated set of noise models, determining new residuals based at least in part on determining the new process output, and determining, as newly updated noise models, new alterations to the set of noise models based at least in part on the new residuals and the hat matrix until the adjustments converge, a difference between a standard deviation associated with the new residuals and 1 is less than a threshold difference, or an end condition is satisfied.

19. The non-transitory computer-readable medium of claim 14, wherein determining the first adjustment to the first noise model and the second adjustment to the second noise model normalizes covariances associated with the first noise model and the second noise model such that the covariances associated with the first noise model and the second noise model are normalized with respect to each other.

20. The non-transitory computer-readable medium of claim 14, wherein the first noise model and the second noise model are part of at least one of:

a localization component, a simultaneous localization and mapping component, a Kalman filter, or a pose estimate component; and the process output comprises at least one of a vehicle pose, map, factor graph, pose graph, vehicle state or predicted state, or an object state or predicted state.

* * * * *